(12) United States Patent
Priegel

(10) Patent No.: US 7,713,501 B2
(45) Date of Patent: *May 11, 2010

(54) SYSTEM FOR PROVIDING A CHEMICAL TO A FLUID

(75) Inventor: Jack C. Priegel, El Paso, TX (US)

(73) Assignee: Twist Engine, Inc., El Paso, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/210,735

(22) Filed: Sep. 15, 2008

(65) Prior Publication Data

US 2009/0008339 A1 Jan. 8, 2009

Related U.S. Application Data

(63) Continuation of application No. 11/187,060, filed on Jul. 22, 2005, now Pat. No. 7,595,022.

(51) Int. Cl.
*C02F 1/68* (2006.01)
*C02F 1/50* (2006.01)
(52) U.S. Cl. .................. 422/261; 210/739; 210/749; 210/753; 210/764; 210/198.1
(58) Field of Classification Search .................. 422/265
See application file for complete search history.

(56) References Cited

U.S. PATENT DOCUMENTS

| | | | |
|---|---|---|---|
| 3,420,637 A | 1/1969 | Halff et al. | |
| 3,833,044 A | 9/1974 | Wallace | |
| 4,234,425 A | 11/1980 | Leo | |
| 4,414,990 A * | 11/1983 | Yost | 132/321 |
| 4,659,459 A | 4/1987 | O'Leary et al. | |
| 4,917,868 A | 4/1990 | Alexander et al. | |
| 4,986,902 A | 1/1991 | Serna | |
| 5,149,354 A | 9/1992 | Delaney | |
| 5,213,428 A | 5/1993 | Salman | |
| 5,276,935 A | 1/1994 | Lemon et al. | |
| 5,373,599 A | 12/1994 | Lemon et al. | |
| 5,556,279 A * | 9/1996 | Wolf et al. | 433/82 |
| 5,800,823 A * | 9/1998 | Blass | 424/400 |
| 5,836,769 A | 11/1998 | Spencer | |
| 5,846,522 A | 12/1998 | Kosti | |
| 5,865,197 A * | 2/1999 | Bible et al. | 132/321 |
| 5,888,578 A | 3/1999 | Sanduja et al. | |
| 5,916,533 A | 6/1999 | Ruta et al. | |
| 6,116,252 A | 9/2000 | Stelmach | |
| 6,238,553 B1 | 5/2001 | Lin | |
| 6,531,056 B2 | 3/2003 | Hammonds | |

FOREIGN PATENT DOCUMENTS

EP 0 214 854 A2 3/1987
WO 2005/030653 A1 4/2005

* cited by examiner

*Primary Examiner*—Elizabeth L McKane
(74) *Attorney, Agent, or Firm*—Fitch, Even, Tabin & Flannery

(57) ABSTRACT

A system for providing a chemical to a stream of a fluid. The system includes an elongate member with the chemical therein and moveable through the fluid to provide the chemical to the fluid. Optionally, the elongate member may be unwound from a first reel to a second reel through the stream of fluid to provide the chemical to the fluid.

20 Claims, 1 Drawing Sheet

SYSTEM FOR PROVIDING A CHEMICAL TO A FLUID

CROSS-REFERENCE TO RELATED APPLICATION

This application is a continuation of prior application Ser. No. 11/187,060, filed Jul. 22, 2005, now U.S. Pat. No. 7,595,022, which is hereby incorporated herein by reference in its entirety.

FIELD OF THE INVENTION

The invention is directed to a system and a method for providing a chemical into a fluid stream and, in particular, to a system and a method for providing a low concentration of a chemical into a fluid stream from an elongate member, such as a monofilament line, strand, or the like, having the chemical therein.

BACKGROUND OF THE INVENTION

The beneficial effects of adding fluoride to drinking water are well known.

Fluoride at a concentration of about one part per million (ppm) is known to greatly reduce tooth decay, contribute to good bone health, and may also substantially reduce osteoporosis in post-menopausal women. It is also known, however, that high levels of fluorine can be toxic and a strong irritant to human tissue. Nevertheless, it is established that concentrations of fluoride at about 1 ppm, levels known to provide the health benefits, are well below the amounts resulting in adverse health effects. Consequently, it is important if fluoride is added to drinking water that the concentration be maintained and controlled near such levels.

Because of the beneficial health benefits of low levels of fluoride, many cities and municipalities have undertaken a fluoridation program adding a fluoride salt to public drinking water to achieve the about 1 ppm concentration of the fluoride. For instance, it is common for larger cities or municipalities to add a fluosilicic acid, sodium silicofluoride, or sodium fluoride to the city water supply as a part of the fluoridation program. In a large water system, such as a water processing facility that typically processes greater than about 30,000,000 gallons of water daily, it is feasible to achieve consistent, low-levels of fluoride in the drinking water using a variety of common chemical feed pumps, such as peristaltic or pulse-feed pumps at the water processing facility. Because the large water facility processes considerable volumes of water, such pumps are effective at providing, maintaining, and controlling the fluoride at the about 1 ppm concentration.

In smaller water systems, it is often not feasible to duplicate the fluoridation programs of the larger systems due to the difficulty of providing a consistent and low concentration of the fluoride in a smaller volume of water. Current peristaltic and pulse-feed pumps are not only expensive, but often are unable to provide the fluoride in small enough levels to consistently maintain about 1 ppm concentration in a low volume of water. Even utilizing very high-cost precision pumps, the metering of fluoride in low volumes of water at levels of 1 ppm consistently is often difficult to achieve and maintain. As a result, many small municipalities, such as cities that operate a water processing facility that typically processes less than about 60,000 gallons of water daily, usually do not undertake a fluoridation program because of the expense and difficulty in achieving and controlling the required low levels of fluoride in the water streams.

Likewise, individual homes in rural areas often do not fluoridate their water because such homes usually obtain water from individual wells, shared wells, or spring boxes. Efficiently fluoridating these individual water supplies is also very difficult for similar reasons. Moreover, in an individual home water system, such as the well, the volumes of water are substantially lower than the amounts processed by the small water processing facility; as such, even greater difficulties are encountered in supplying and maintaining a fluoride concentration of about 1 ppm in such home water systems.

In addition, other chemicals are often added to a variety of fluids in low levels for numerous reasons, such as disinfecting, maintaining proper pH, maintaining proper alkalinity levels, and the like. Often it is desired to achieve such characteristics in a continuous, low volume process. In such a process, similar difficulties arise when attempting to achieve consistent and low concentrations of chemicals in the fluid.

As a result, it is desired to obtain a system and method of supplying a consistent, low concentration of a chemical to a fluid that is cost effective and easy to maintain and control such low concentrations.

DESCRIPTION OF THE PREFERRED EMBODIMENT

Figure 1:
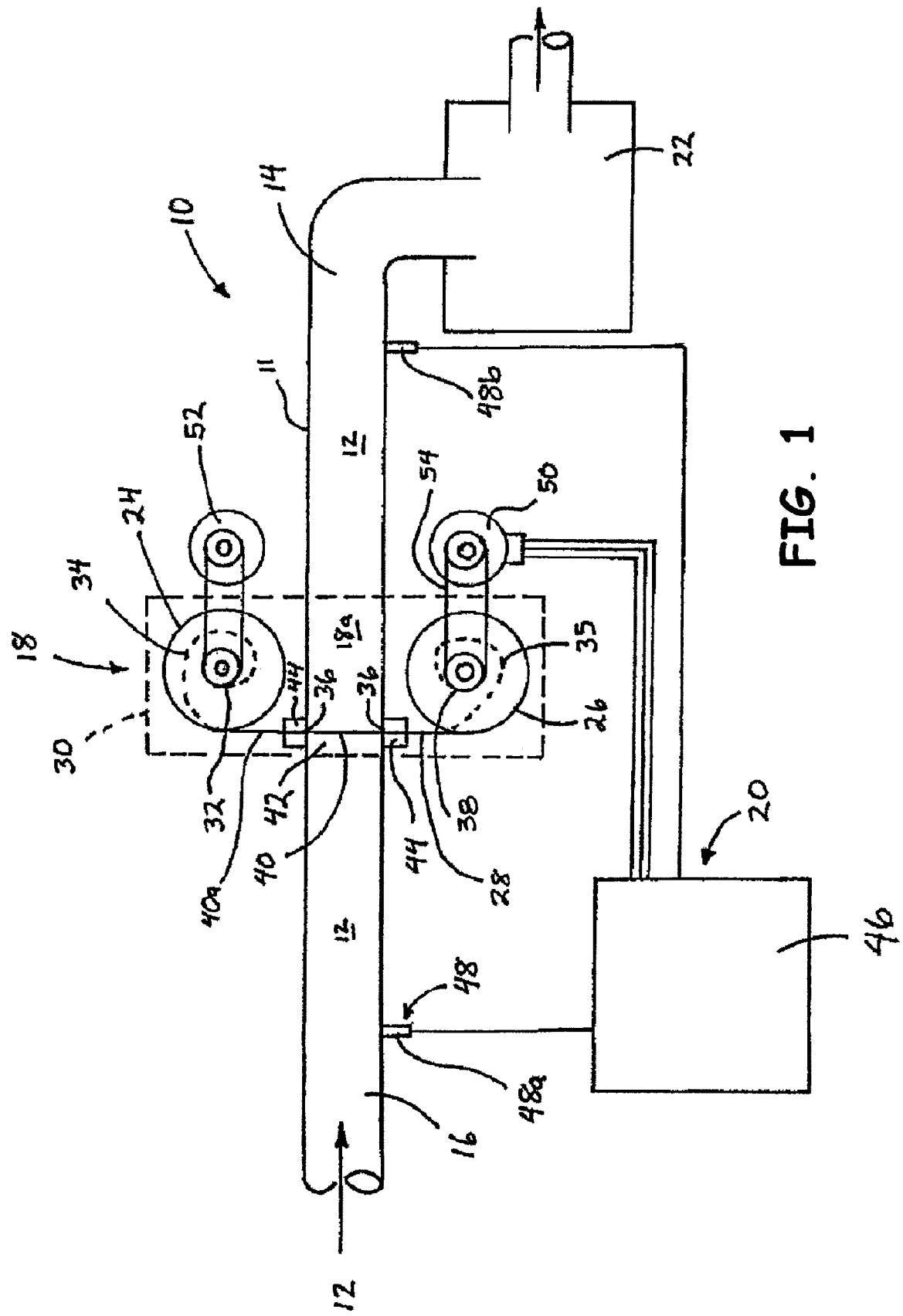
FIG. 1 is a schematic view of a system embodying features of the present invention.

Referring to FIG. 1, there is illustrated a system 10 for providing a chemical to a stream of a fluid embodying features of the present invention. In general, system 10 includes a fluid stream 12 having a downstream portion 14 and an upstream portion 16, a chemical supply module 18, and, preferably, a control mechanism 20. Optionally, system 10 may also include a tank 22, which may be downstream of the chemical supply module 18, for collecting and testing fluid parameters. In a preferred embodiment, the system 10 provides a chemical to the fluid by measuring a fluid characteristic, such as the downstream chemical concentration and/or the fluid flow rate, and automatically adjusting the level of chemical release from the chemical supply module 18 accordingly so that a constant concentration of the chemical is obtained. Alternatively, the system 10 can be preset to provide a predetermined level of chemical to the fluid stream 12, which can be manually adjusted as needed.

In general, the system 10 provides a concentration of the chemical to the fluid stream 12 as it flows through the chemical supply module 18. Preferably, the system provides a concentration of the chemical at approximately 1 ppm and, optionally, 1 ppm or lower. The fluid is preferably a water stream, but may also be air, oil, coolant, or other fluid requiring a concentration of a chemical therein. The chemical is preferably a metal halide and, most preferably, sodium fluoride. Accordingly, in one embodiment, the system 10 provides a fluoride, such as a sodium fluoride, to a water stream at a concentration of about 1 ppm or lower. In this manner, system 10 may be used as part of a fluoridation system. For purposes of this invention, fluoridation or fluoridate means providing a fluoride to a water stream at a concentration of generally 1 ppm; however, as further discussed below, the system 10 may also add other chemicals to the fluid stream 12.

System 10, however, is not limited to fluoridation. Other halides, such as other alkali metal halides or alkaline earth metal halides may also be provided to the fluid stream 12 in a similar manner. For instance, chemicals such as, but not limited to, sodium chloride, sodium bromide, potassium chloride, potassium bromide, magnesium chloride, magnesium bromide, calcium chloride, calcium bromide, or the like may also be used in system 10, as appropriate, to disinfect, adjust fluid pH, maintain fluid alkalinity, or impart other characteristics to stream 12. Likewise, silver nitrate may also be used as a disinfectant in a similar manner. The various chemicals to be added to the stream 12 may be utilized separately or in combination depending on the characteristics of the fluid stream 12 desired.

Preferably, system 10 fluoridates, disinfects, or provides other characteristics to a water-supply stream leading to an individual home or dwelling unit. In such use, the downstream portion 14 would lead to the individual home, or optionally as illustrated in FIG. 1, to the tank 22 for holding a small quantity of the water having the chemical therein for later use in the individual home. In this configuration, the upstream portion 16 would provide water from the home's water source, such as an individual well, a shared well, or a spring bank. Similarly, system 10 may also be used as part of a small water processing facility for a small city or municipality. In this form, system 10 would typically be installed in-line at the water processing facility. When used in this manner, system 10 preferably provides fluoridation to a city water system that processes less than about 60,000 gallons of water daily.

As previously discussed, one portion of the system 10 is the chemical supply module 18. Preferably, the module 18 provides the chemical to the fluid stream 12 when the fluid flows through at least a portion 18a of the module 18. Again referring to FIG. 1, the module 18 includes an elongate member 28 and, preferably, a first reel 24 and a second reel 26, which is spaced a distance from the first reel 24. The module 18 may also be contained within an optional cartridge or housing 30 such that the elongate member 28, the first reel 24, and the second reel 26 are enclosed by a protective cover or other barrier.

Again referring to FIG. 1, the module 18 is installable on a fluid conduit or pipeline 11 such that the fluid stream 12 flows through the portion 18a of the module 18. When installed on conduit 11 in such a manner, a portion of the elongate member 28 contacts the fluid stream 12 and, preferably, as will be further described below, traverses through the fluid stream 12. More specifically, in one embodiment, the conduit 11 generally includes apertures 36, other openings, or the like sized so that the elongate member 28 extends into and through conduit 11 so as to contact the water stream 12. If apertures 36 are used, such openings are preferably spaced on opposite sides of the conduit 11 and sealed with a seal member 44 suitable to seal the aperture 36 from water leakage but also sized to allow the elongate member 28 to pass therethrough. For instance, the seal member 44 may be any gland (Teflon or the like), packing material, or gasket known in the art to seal an opening but allow an elongate member, such as elongate member 28, to extend therethrough. To install the module 18 on the conduit 11, the system 10 preferably includes shut-off valves (not shown) upstream and downstream of the apertures 36 to facilitate installation of the module 18 without the water stream 12 flowing. However, the module 18 may be installed in any manner known in the art, with or without the fluid stream flowing, for coupling or mating a structure to a conduit or pipeline having a portion extending therethrough.

More specifically, in a preferred embodiment, the elongate member 28 is coupled both to the first reel 24 and the second reel 26. That is, the elongate member 28 has a first end 32 coupled to the first reel 24 and also a sufficient length to have a portion 34 wound thereon. The elongate member 28 then extends outwardly from the first reel 24 and terminates in a second end 38, which is coupled to the second reel 26. The second reel 26 may also have a portion 35 of the elongate member 28 wound thereon. The elongate member 28 may be coupled to the reels 24 and 26, for example, through a securing structure, such as a clamp, slot, or the like, or by being pinched under a few winds of the wound portions 34 or 35 around the reels 24 and 26. However, the elongate member 28 may also be secured to reels 24 and 26 in any manner known in the art that secures an elongate member to a reel. In the configuration described above, the elongate member 28 also includes a supply portion 40, which spans a gap 42 between the spaced first and second reels 24 and 26. As is more further described below, the supply portion 40 incrementally changes as the elongate member 28 moves through the fluid 12 or, preferably, is unwound from the first reel 24 through the fluid stream 12 and wound on the second reel 26.

When the module 18 is installed on the system 10, the supply portion 40 contacts and moves through or traverses through the fluid stream 12. In a preferred embodiment, the bulk of the elongate member 28 will initially be wound on the first reel 24 such that the elongate member 28 may then be unwound from the first reel 24, contact the water stream 12 at the supply portion 40 in the gap 42, and then be wound onto the second reel 26. As a result, the supply portion 40 will incrementally change as the elongate member 28 is moved or unwound through the fluid 12.

To supply the chemical to the fluid stream 12, the elongate member 28 includes a chemical that is dispersible into the fluid stream 12 upon the fluid contacting the supply portion 40. In order to supply the chemical to the fluid 12, the elongate member 28 may be any material that includes a chemical therein and later allows the dispersal of such chemical into the fluid stream. For purposes of this invention, the "chemical therein" or the "chemical in" means the chemical in, on, imbedded, impregnated, or otherwise added to, introduced into or onto, or combined with the elongate member 28. In one form, the elongate member 28 may be a line, cord, strand, filament, or the like that the chemical may be added therein and is also sufficiently flexible to be windable on the reels 24 and 26. Preferably, the elongate member 28 is formed form a hydrophilic material, and most preferably, a monofilament line or an extruded polymer or monomer, such as a nylon strand.

The chemical may be added to the elongate member 28 through several mechanisms. For example, an aqueous solution of the chemical may be applied in a predetermined amount to a hydrophilic material, such as nylon. To apply the chemical to the elongate member 28, the elongate member 28 is drawn through a supply reservoir containing an aqueous solution of the chemical. The concentration of the chemical in the supply reservoir may be varied depending on the concentration desired in the fluid stream 12. That is, a higher concentration of the chemical in the aqueous solution within the supply reservoir will lead to higher concentrations in the fluid stream 12. Alternatively, predetermined amounts of the chemical may be added to the polymer or monomer material prior to extrusion into the elongate member. That is, predetermined amounts of the chemical may be added to the raw plastic stock prior to the extrusion of the plastic into the elongate member 28. Of course, the amounts of the chemical added to the plastic stock will vary depending on the desired concentration in the fluid stream 12.

In use, the chemical is provided to the fluid stream 12 by introducing a portion of the elongate member 28, such as the supply portion 40, to the fluid stream 12. While not wishing to be limited by theory, it is believed that the chemical is added to the fluid through a diffusion, leaching, or the general mass transfer of the chemical to the fluid as the fluid flows past the supply portion 40. In one mechanism, the transfer of the chemical may be from a region of high concentration in the elongate member 28 to a region of lower concentration in the fluid stream 12; however, other transfer mechanisms are also possible. Eventually, after a sufficient duration or flow of water, the supply portion 40 will be generally depleted of the chemical; therefore, to constantly supply the chemical to stream 12, a new supply portion 40*a* is provided to contact the fluid 12. That is, the elongate member 28 is moved through the fluid 12 such that the new supply portion 40*a*, which has yet to contact the fluid 12, is moved to a position that contacts the fluid 12. In a preferred operation, as previously described, the elongate member 28 is moved through the fluid by being unwound from the first reel 24 via the rotation of the second reel 26 to incrementally provide the new supply portion 40*a* at a predetermined rate.

To maintain a generally constant amount of the chemical in the fluid 12, the concentration of the chemical can be adjusted by changing various system parameters. For instance, altering the amount of the chemical added in the elongate member 28, as described above, is one factor that affects the amount of the chemical available to transfer to the fluid 12. Likewise, altering either the rate at which the elongate member 28 is moved through the fluid or the flow rate of the fluid past the elongate member 28 are other factors that affect the amount of the chemical transferred to the fluid 12. In addition, varying the diameter or width of the elongate member 28 or altering the length of the supply portion 40 may also be used to control the concentration of the chemical in the fluid 12. That is, a larger diameter or larger supply portion 40 provides more of the elongate member 28 to supply the chemical and, therefore, higher concentrations. Consequently, the amount of the chemical that is available to transfer to the fluid 12 is generally dependent on the amount of the chemical in the elongate member 28, the diameter or size of the elongate member 28, the length of the supply portion 40, and/or the duration that each incremental supply portion 40 contacts the fluid 12 as determined by an unwind rate or fluid flow rate.

While not wishing to be limited by theory, in a preferred embodiment, the rate of the elongate member 28 moving through the fluid 12 and the flow rate of the fluid 12 each have a generally inverse relationship with the amount of chemical provided to the fluid. For instance, given a generally constant flow rate, if the elongate member 28 moves through the fluid 12 as a fast rate of speed, such as by rotating the second reel 26 at a fast revolution, then each incremental supply portion 40 will only contact the fluid 12 for a first duration providing a first concentration of the chemical in the fluid 12. On the other hand, if the elongate member 28 moves through the fluid 12 at a slower rate of speed, such as by rotating the second reel 26 at a slower revolution, then each incremental supply portion 40 will contact the fluid 12 for a longer, second duration to provide a higher, second concentration of the chemical in the fluid 12. Likewise, given a generally constant rate of movement of the elongate member 28, then increasing or decreasing the fluid 12 flow rate will also affect the chemical concentration in a similar manner. In one instance, to achieve a concentration of about 1 ppm of sodium fluoride in water, the system 10 will include the elongate member 28 having about 11 weight percent of sodium fluoride therein, which is unwound at a speed of about one inch per hour through a water stream flowing at 11 gallons per minute. Of course, other combinations of such parameters will also achieve the about 1 ppm.

Again referring to FIG. 1, the system 10 also preferably includes the control mechanism 20, which monitors and controls the system 10. In general, control mechanism 20 preferably includes a control unit 46, at least one sensing device 48, a motor device 50, and a resistance mechanism 52. While illustrated with the control mechanism 20, the system 10 may also operate without the control mechanism 20 at preset conditions requiring each condition to be manually adjusted if needed.

The control unit 46 is preferably a digital or analog microprocessor or a combination of microprocessors. For example, the control unit 46 may be a typical adjustable or variable speed drive; however, any type of controller known in the art is suitable for control unit 46. The control unit 46 generally monitors or receives information from various sources and generally controls or provides appropriate outputs, such as system adjustments, to ensure the system 10 provides the desired concentration of the chemical to the fluid 12. For instance, the control unit 46 may receive, by way of non-limiting example, information on the fluid 12, information on the module 18, or information on overall system 10 parameters. Based on such information, the control unit 46 will initiate, for example, appropriate outputs or controls on the system 10 such as increasing or decreasing the fluid 12 flow rate; increasing, decreasing, or stopping the movement of the elongate member 28; signaling an appropriate alarm condition; or other appropriate controls or outputs.

As discussed above, the control unit 46 may receive information on the fluid 12. Such information may include the flow rate or the concentration of the chemical in the fluid 12 from an appropriate sensing device, which may be either upstream 16 or downstream 14 of the module 18. In addition, if optional tank 22 is utilized, a concentration of the chemical in tank 22 may also be provided to the control unit 46.

The control unit 46 may also receive information on the module 18. Such information may include the status of the first and second reels 24 and 26. For instance, the unit 46 may receive data on an amount, length, or weight of the elongate member 28 on the first reel 24 and may provide an indication of such information so as to prevent runout of the elongate member 28. Likewise, the unit 46 may also receive an indication that the second reel 26 has a predetermined amount, weight, or length of the elongate member 28 wound thereon. Based on such information, control unit 46 may provide an indication of when the reels need to be changed because a large portion of the elongate member 28 has been unwound from the first reel 24 and is now wound on the second reel 26. The unit 46 may also receive information indicating that the elongate member 28 is broken, the first reel 24 is unwinding at an incorrect rate (i.e. too fast, too slow, or stopped), the second reel 26 is unwinding at an incorrect rate (i.e. too fast, too slow, or stopped), or other trouble conditions with respect to the module 18.

The control unit 46 may also receive other information on the system 10, such as the status of various components, devices, or system conditions. For instance, the unit 46 may receive information on the status of the at the least one sensing device 48, the status on the motor device 40, the status on the resistance mechanism 52, or the status of other components. With such information, the control unit may make appropriate adjustments or controls to the system 10, such as indicating an alarm condition, stopping the system operation all together, or other appropriate controls.

Again referring to FIG. 1, the embodiment is shown with at least one sensor 48, which may be at a down stream 14 location, an upstream location 12, at the tank 22, or other suitable location. Preferably, the system 10 includes two sensors 48a and 48b. For example, the sensor 48a is preferably a volume or flow rate sensor to measure fluid flow and the sensor 48b is preferably a concentration sensor to measure the concentration of the chemical in the fluid 12.

More specifically, sensor 48a may be any type of sensor that measures volume, flow rate, or rate of the fluid 12 in the conduit 11. The sensor 48a may be a paddle, turbine, ultrasonic, or the like sensor that determines the rate of flow of the fluid 12 and, preferably, provides such information to the control unit 46. As illustrated in FIG. 1, the sensor 48a is shown in an upstream 16 location; however, any location within system 10 is suitable for sensor 48a.

As a flow rate sensor, the sensor 48a preferably measures the flow, rate, or volume per unit time of the fluid 12 within the conduit 11 and, preferably, provides such information to control unit 46. Based on such information, control unit 46 may then adjust various parameters of the system 10, such as the rate at which the elongate member 28 moves through the fluid. As previously discussed, adjusting the rate at which the reels are rotated is one method that the control unit 46 may alter the duration that each incremental supply portion 40 remains in contact with the fluid 12; as such, adjusting the amount of chemical that is provided to the fluid 12. For instance, in order to maintain a generally constant concentration of the chemical in the fluid 12, if the flow rate sensor 48a determines that the fluid flow rate is increasing, then the control unit 46 may also increase the rate of unwind of the elongate member 28 from the first reel 24 a corresponding amount by increasing the rate at which the second reel 26 rotates. If the flow sensor 48a determines that the fluid flow rate is decreasing, then the control unit 46 may then decrease the rate at which the elongate member 28 is unwound from the first reel 24 a corresponding amount by decreasing the rate at which the second reel 26 rotates. Optionally, the flow rate sensor 48 may also be a manual sensor that provides a measurement of flow rate that requires a manual adjustment to the module 18 to maintain the desired concentration of the chemical.

The sensor 48b preferably is a device that measures the concentration of the chemical in the fluid 12. As such, the sensor 48b may be any type of sensor that measures a concentration of the chemical in a fluid that is known in the art. It should also be apparent to one skilled in the art that the sensor 48b will preferably vary depending on the chemical selected. Preferably, sensor 48b measures the chemical concentration and also provides such information to the control unit 46. As with sensor 48a, the control unit may adjust the system 10 in a similar manner based on the information received from the sensor 48b. Additionally, sensor 48b may also be a manual test kit or other device that validates the proper concentration of the chemical upon a manual test initiated by the user of the system. In this manner, the system 10 may also operate at predetermined conditions, which may be manually adjusted based on the results of the manual testing.

Again referring to FIG. 1, the motor device 50 is any device that provides a rotary motion to the second reel 26. Preferably, motor device 50 is a stepper motor or equivalent. In one form, the motor device 50 is controlled by the control unit 46 and adjusts the rotation speed or revolution rate of the second reel 26 based on the flow sensor 48a, the concentration sensor 48b, or other input. As illustrated, the motor device 50 is coupled to the second reel 26 via a belt 54 that transfers the rotary motion to the second reel 26; however, the motor device 50 may be coupled to the second reel 26 by any method known in the art.

The resistance mechanism 52 is any device that impedes the rotary motion of the first reel 24, such as a braking device. In this manner, the resistance mechanism 52 generates a resistance force to the rotation of the first reel 24. That is, the resistance mechanism 52 impedes the unwinding of the elongate member 28 as the second reel 26 rotates and unwinds or pulls the elongate member 28 off the first reel 24. Accordingly, an appropriate amount of tension is maintained on the supply portion 40 within the gap 42. However, the brake force and tension may vary depending on the type of material used for the elongate member 28, the unwind rate, the flow conditions, or other system parameters.

It will be understood that various changes in the details, materials, and arrangements of parts and components which have been herein described and illustrated in order to explain the nature of the invention may be made by those skilled in the art within the principle and scope of the invention as expressed in the appended claims.

What is claimed is:

1. A system to provide a chemical to a fluid, the system comprising:
    a stream of the fluid having a flow rate;
    an elongate line constructed from a flexible material and having the chemical impregnated within the flexible material, the elongate line provided in a module mounted so that the elongate line is configured to traverse through the fluid stream;
    at least one supply portion of the flexible material with the chemical therein contacting the fluid stream to provide the chemical to the fluid; and
    the chemical being transferred from the at least one supply portion of the flexible material to the fluid in order to provide a concentration of the chemical in the fluid downstream from the elongate line.

2. The system of claim 1, wherein the chemical is selected from the group consisting of a metal halide and silver nitrate.

3. The system of claim 2, wherein the metal halide is sodium fluoride.

4. The system of claim 3, wherein the elongate line has an amount of the chemical impregnated within sufficient to form the downstream concentration of the sodium fluoride up to about 1 ppm.

5. The system of claim 1, wherein the elongate line includes an extruded polymer.

6. The system of claim 1, wherein the elongate line includes a nylon strand.

7. The system of claim 1, wherein the elongate line includes an extruded polymer having the chemical added therein prior to extrusion.

8. The system of claim 1, wherein the fluid includes water.

9. The system of claim 8, further comprising a single dwelling unit and wherein the water is supplied to the single dwelling unit.

10. A method of providing a chemical to a fluid, the method comprising:
    drawing a flexible elongate line with a chemical impregnated within the elongate member through a stream of the fluid at a predetermined rate providing the chemical to the fluid;
    measuring a fluid parameter; and
    adjusting the predetermined rate based on the fluid parameter to provide a generally constant concentration of the chemical in the fluid downstream of the flexible elongate line.

11. The method of 10, wherein the fluid parameter is a flow rate.

12. The method of claim 10, wherein the fluid parameter is the concentration of the chemical downstream of the elongate line.

13. The method of claim 10, wherein the chemical is selected from the group consisting of a metal halide and a silver nitrate.

14. The method of claim 10, wherein the chemical is sodium fluoride.

15. The method of claim 10, wherein the constant concentration is generally about 1 ppm.

16. The method of claim 10, wherein the fluid is water.

17. The method of claim 16, wherein the water is supplied to a dwelling unit.

18. A system to provide a chemical to water flowing to a dwelling unit, the system comprising:

a dwelling unit;

a supply of water flowing to the dwelling unit;

an elongate member constructed of a flexible material and having a chemical impregnated within the elongate member, the elongate member operable to traverse through the flow of water;

at least one supply portion of the elongate member contacting the water flow to provide the chemical to the water; and the chemical transferable from the at least one supply portion to the water to provide a concentration of the chemical downstream from the flexible elongate member to supply water to the dwelling unit having the chemical therein.

19. The system of claim 18, wherein the chemical is sodium fluoride.

20. The system of claim 18, wherein the elongate member is an extruded polymer line.

* * * * *